United States Patent
Wells (10) Patent No.: US 10,330,049 B2
(45) Date of Patent: Jun. 25, 2019

(54) HIGH PRESSURE FUEL GAS PUMP

(71) Applicant: ACD, LLC, Santa Ana, CA (US)

(72) Inventor: Michael Wells, Corona, CA (US)

(73) Assignee: ACD, LLC, Santa Ana, CA (US)

( * ) Notice: Subject to any disclaimer, the term of this patent is extended or adjusted under 35 U.S.C. 154(b) by 0 days.

(21) Appl. No.: 15/689,216

(22) Filed: Aug. 29, 2017

(65) Prior Publication Data

US 2018/0058441 A1    Mar. 1, 2018

Related U.S. Application Data (60) Provisional application No. 62/380,855, filed on Aug. 29, 2016.

(51) Int. Cl.

| | | |
|---|---|---|
| *F02M 21/02* | (2006.01) | |
| *F04B 49/06* | (2006.01) | |
| *F04B 15/08* | (2006.01) | |
| *F04B 17/04* | (2006.01) | |
| *F04B 9/02* | (2006.01) | |
| *F04B 11/00* | (2006.01) | |
| *F04B 23/02* | (2006.01) | |

(52) U.S. Cl.
CPC .... *F02M 21/0218* (2013.01); *F02M 21/0245* (2013.01); *F04B 9/02* (2013.01); *F04B 11/005* (2013.01); *F04B 15/08* (2013.01); *F04B 17/042* (2013.01); *F04B 23/026* (2013.01); *F04B 49/065* (2013.01); *F02M 21/02* (2013.01); *F04B 2015/081* (2013.01); *Y02T 10/32* (2013.01)

(58) Field of Classification Search
CPC ...... F04B 49/065; F04B 17/042; F04B 1/128; F04B 1/126; F04B 15/08; F04B 1/124; F04B 2015/081–2015/0826
See application file for complete search history.

(56) References Cited

U.S. PATENT DOCUMENTS 3,212,280 A * 10/1965 Thomas ............... F04B 7/0073
                                                            417/520
4,639,197 A *  1/1987 Tornare ................ F04B 3/00
                                                            417/259

(Continued)

FOREIGN PATENT DOCUMENTS

EP         1 018 601 A2    7/2000

OTHER PUBLICATIONS

Ingenieurbüro CAT M. Zipperer GmbH, of Ballrechten-Dottingen, Pulse-free Micrometering Pump HPLH PF "Pulsefree". http://www.irmeco.de/H232/DWN/hplh_pulse_free_pumps_pe_08_2016.pdf, 2 pages.

(Continued)

*Primary Examiner* — Charles G Freay
(74) *Attorney, Agent, or Firm* — SoCal IP Law Group LLP; Guy Cumberbatch (57) ABSTRACT

There is disclosed a modular, linearly actuated high-pressure pump for use in various applications with high-pressure fuel systems, in particular liquid cryogenic fuels such as Natural Gas, Hydrogen, Nitrogen and Argon (LNG/LH2/LN2/LAR). The pump utilizes linear actuation which smooths out the power profile. There are no dynamic seals which prevents failure from leakage. The primary benefit of a smooth, no pulse output and lack of dynamic seals is a longer life of the pump. Marine fuel systems that utilize cryogenic LNG are a primary application.

24 Claims, 7 Drawing Sheets

(56) References Cited

U.S. PATENT DOCUMENTS

| | | | | |
|---|---|---|---|---|
| 4,915,602 | A | * | 4/1990 | Tschopp .................. F04B 15/06 417/503 |
| 5,575,626 | A | * | 11/1996 | Brown .................... F04B 15/08 417/251 |
| 5,593,288 | A | * | 1/1997 | Kikutani ................. F04B 15/08 417/435 |
| 8,915,719 | B2 | | 12/2014 | Street |
| 2002/0069857 | A1 | * | 6/2002 | Fickel .................... F02M 21/06 123/527 |
| 2002/0149268 | A1 | * | 10/2002 | Yamada .............. B29C 45/5008 307/143 |
| 2003/0051486 | A1 | * | 3/2003 | Ursan .................... F04B 15/08 62/50.6 |
| 2004/0055316 | A1 | * | 3/2004 | Emmer .................... F17C 7/04 62/50.6 |
| 2004/0076534 | A1 | | 4/2004 | Hammonds |
| 2005/0163642 | A1 | * | 7/2005 | Duron ...................... F04B 5/02 417/521 |
| 2015/0040856 | A1 | | 2/2015 | Oka |
| 2016/0222955 | A1 | | 8/2016 | Steffen |

OTHER PUBLICATIONS

European Patent Office, International Search Report and Written Opinion for PCT Application No. PCT/US2017/049058, dated Dec. 13, 2017.

* cited by examiner

HIGH PRESSURE FUEL GAS PUMP

RELATED APPLICATIONS

The present application claims priority under 35 U.S.C. § 119 to U.S. Provisional Patent Application No. 62/380,855, filed Aug. 29, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a high-pressure gas pump especially for marine service and, more particularly, to a modular, linearly actuated high-pressure pump for use in applications with high-pressure fuel systems such as marine, industrial gas and alternative energy fuel systems, for instance liquid natural gas (LNG) pumps for marine use.

Description of the Related Art

Global energy demands continue to rise year after year as existing oil reservoirs become depleted and the search for replacements spreads to deeper parts of the ocean, requiring massive investment costs. A general change in energy politics has nuclear and coal power losing popularity while gas from the US and Middle-East is emerging as a viable alternative. Political instability has also encouraged countries to develop an energy policy that makes them more independent from pipeline supplies. In this scenario, the propulsion of large cargo ships using LNG over diesel or fuel oil is an obvious solution. Modern LNG tankers require highly reliable propulsion systems as engine availability is critical.

A typical LNG marine propulsion system includes an LNG tank, a fuel supply system, and the propulsion engines which receive the LNG under pressure. LNG is stored and delivered at high-pressures and cryogenic temperatures (below −150° C., −238° F. or 123 K), typically around −260° F. and at 250 psi. The fuel supply systems currently available for high-pressure cryogenic LNG are susceptible to leakage or failure from various mechanical sources. Such leaks reduce the service life and increase the maintenance load for LNG pumping equipment. In the same vein, other industrial gas service pumps used for liquid nitrogen (LN2), liquid argon (LAR) and liquid hydrogen (LH2) are also susceptible to leakage and attendant maintenance problems.

Additionally, Hydrogen is seen as a future transport fuel. The use of hydrogen in the production of transport fuels from crude oil is increasing rapidly, and is vital where tar sands are the oil source. Hydrogen can be combined with $CO_2$ to make methanol or dimethyl ether which are likely to become important transport fuels. Nuclear energy can be used to make hydrogen electrolytically, and in the future high-temperature reactors are likely to be used to make it thermochemically. The energy demand for hydrogen production could exceed that for electricity production today.

Consequently, there remains a need for a high-pressure pump for LNG/LH2/LN2/LAR and other uses that possesses a longer service life and is easier to maintain.

SUMMARY OF THE INVENTION

Embodiments of the present invention seek to provide a high-pressure pump for LNG/LH2/LN2/LAR and other uses which simplifies and reduces the size of current systems, and has a life span increase of 200-500%, significantly reduced operating costs, and greater ease of maintainability.

In one embodiment, a system for pumping of high-pressure cryogenic fuel from a fuel source to provide a smooth, pulse-free output comprises a plurality of linear pumps each including in series an upper power end and a lower fluid end, the power end having a linear-actuated drive system terminating in a drive shaft that linearly reciprocates along an axis. The power end drive system of each pump is independently controllable via software contained within a multi-axis electronic controller, and each linear-actuated drive system is operable at a low turndown ratio to an output speed of about 1 cycle per minute. An absence of packing seals in the lower fluid end reduces wear and extends operating life of the system. The fluid end has a piston coupled to the drive shaft of the power end so as to linearly reciprocate within a fluid cylinder, the piston having a head with a plurality of piston rings distributed thereon that provide sealed sliding contact with an inner lumen of the fluid cylinder. An inlet tank receives and stores a high-pressure cryogenic fuel from the fuel source, and an inlet passageway leads from the inlet tank to a lower end of each fluid cylinder. The inlet passageway opens into valved communication with a head space just below the head of the piston therein, wherein upward motion of the piston creates a negative pressure gradient in the head space sufficient to allow high-pressure fuel into the head space, and downward motion of the piston expels high-pressure fuel through a lower flow passage and into an outlet port common to all of the fluid cylinders. A sealed housing is disposed around one or more of the linear pumps and is sealed to contain any of the high-pressure cryogenic fuel that escapes from within the fluid cylinder. Advantageously, operation of the system includes coordinated actuation of the separate pumps to result in a pulse-free output pressure profile.

An exemplary method for pumping of high-pressure cryogenic fuel from a fuel source to provide a smooth, pulse-free output comprises providing a pumping system having a plurality of linear pumps each including in series an upper power end and a lower fluid end. The power end has a linear-actuated drive system terminating in a drive shaft that linearly reciprocates along an axis, and the power end drive system of each pump is independently controllable via software contained within a multi-axis electronic controller. Beneficially, the lower fluid end has no packing seals so as to reduce wear and extend operating life. The fluid end of each linear pump has a piston coupled to the drive shaft of the power end so as to linearly reciprocate within a fluid cylinder, and the fluid cylinders of the plurality of linear pumps are all mounted together and have outlet flow passages leading to a common outlet port. The method includes supplying cryogenic fuel from a fuel source to inlet passageways of the fluid cylinders of each of the plurality of linear pumps. The drive system is actuated to displace the drive shaft and coupled piston of each of the plurality of linear pumps so as to pull cryogenic fuel into the respective fluid cylinders and expel the cryogenic fuel through the outlet flow passages to the common outlet port. Coordinating actuation of the separate linear pumps results in a pulse-free output pressure profile. Finally, a sealed housing is provided around one or more of the linear pumps, the housing being sealed to contain any of the high-pressure cryogenic fuel that escapes from within the fluid cylinder.

In one embodiment, the cryogenic fuel is liquid natural gas stored at temperatures of below −150° C., and the sealed housing maintains an inner pressure which is about the same as the stored liquid natural gas. Preferably, each linear-actuated drive system is operable at a low turndown ratio to an output speed of about 1 cycle per minute.

In one embodiment, each power end drive system comprises an electro-mechanical actuator having an actuator in the form of a rotating ball screw aligned along the axis, and the system includes a sensor to monitor rotational movement of the actuator and a closed loop control system configured to maintain position, velocity, and acceleration components of the drive shaft and piston therefore. Alternatively, each power end drive system comprises a hydraulic cylinder above the drive shaft whose up and down movement is controlled via an electronic servo valve. The hydraulic drive system may further including a linear variable differential transducer (LVDT) mounted to the hydraulic cylinder that monitors the position of the piston within the fluid cylinder and a closed loop control system configured to maintain position, velocity, and acceleration components of the drive shaft and piston therefore.

There may be a single outer housing sealed around a plurality of the linear pumps. In that case, a common lower manifold plate is preferably provided to which each of the linear pumps mounts and in which the lower flow passages of each linear pump is formed. The single outer housing may comprise an upper housing generally surrounding the upper power end and secured to a lower housing generally surrounding the lower fluid end, and wherein there are no conduits attached to the upper housing so that the upper housing may be easily removed for servicing the power end drive system. Alternatively, there is a separate outer housing sealed around each one of the plurality of the linear pumps, and further including a common lower manifold plate to which each of the linear pumps mounts and in which the lower flow passages of each linear pump is formed.

Desirably, the inlet tank is located immediately below the plurality of linear pumps, and a manifold plate disposed above the inlet tank to which the plurality of linear pumps are attached and in which the lower flow passages of each linear pump are formed.

In a particular embodiment, a valving subsystem between the inlet passageway of each fluid cylinder opens at a sump chamber at a lower end of the fluid cylinder, the sump chamber being located between the fluid cylinder and a lower end of two of the valve members stacked on top of each other. The valve members have axially aligned channels therein leading from the sump chamber to a head space just below the head of the piston, and wherein a lifter valve is biased into contact with an upper valve member to close upper ends of the channels in the absence of a negative pressure gradient in the head space. The valve members further define a flow port therethrough from the head space to the lower flow passage outside of the fluid cylinder that leads to the common outlet port. Consequently, upward motion of the piston creates a negative pressure gradient in the head space sufficient to raise the lifter valve and allow high-pressure fuel into the head space, and downward motion of the piston closes the lifter valve and expels high-pressure fuel through the flow port, lower flow passage and into the common outlet port.

DESCRIPTION OF THE DRAWINGS

FIG. 3A is a perspective view of one of the linear pumps, while FIGS. 3B and 3C are partial sectional views of portions of the internal pump;

FIG. 4 is an enlarged view of a lower end of one of the linear pumps, while

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

The present application discloses an improved modular, linearly actuated high-pressure LNG/LH2/LN2/LAR pump system especially for use in marine applications with high-pressure fuel systems. The term "linear actuation" refers to a system that does not rely on the traditional mode of converting rotational motion to linear motion, which often creates intense vibrations, and thus linear actuation mechanisms smooth out the resulting power profile. Of course, the presently disclosed pump system may be used in transportation applications other than marine with similar benefits, including trains, trucks, and buses. Other non-transportation areas in which the high-pressure LNG pump is useful include industrial gas and alternative fueling applications. Additionally, although liquid natural gas for fueling is the primary commodity that can be pumped using the present systems, liquid nitrogen, hydrogen, argon, and other cryogenic liquid hydrocarbons may also be processed using the pumps described herein. The pump systems disclosed herein have a reduced size, and increased lifespan, reduced operating costs and are easier to maintain.

Prior to a detailed discussion of the exemplary attributes of the high-pressure pump systems, and understanding of the drawbacks with existing mechanical pumps is necessary. The following discussion is not intended to be an admission of what is in the prior art, but instead a recognition on the part of the applicants of witnesses in existing systems.

Part 1: Traditional Reciprocating Pumps

Current reciprocating pump technology consists of two major components: the "power end" (often referred to as "drive end" or "warm end") and the working "fluid end"

(often referred to as the "cold end"). These pumps can be configured in single cylinder arrangements or multiple cylinder arrangements around a common crank shaft. The following paragraphs will discuss a reciprocating pump that is of the "single acting" type, meaning that as the power end allows/induces piston motion towards the crankshaft, the fluid end will draw fluid in at suction pressure, followed immediately after by the piston motion being reversed and moved away from the crankshaft, discharging fluid from the fluid end at a relatively higher discharge pressure.

Reciprocating pumps are typically limited performance by a characteristic known as "rod load", which is the load that is placed on the drive of the pump as a result of the discharge pressure of that pump acting across the area of the piston in the fluid end. Smaller pistons allow for higher pressures before a rod load limit is reached, however this reduces the flow capacity of the pump. Conversely, if the size of the piston is increased, the flow capacity of the pump will increase, however this reduces the maximum discharge pressure of the pump. Increasing the rod load capacity of these pumps is practically achieved through a proportional increase in size of the power end of the pump.

Power Ends:

Traditional power end design takes rotational motion and energy, and then converts it into linear motion and energy via the internal components of the power end. These internal components generally fall into one of two arrangements.

The first arrangement is a cam/follower type in which there is an eccentric mounted or integrated onto the power end's crank shaft with the working piston riding on and being displaced by that eccentric. This design has the advantage of being relatively simple and cheap, however it carries several limitations. The first major limitation is that the working piston must always remain loaded in order to keep it riding against the eccentric to prevent "short stroking". Typically, this is achieved by providing ample suction pressure on the piston to keep it pressed firmly onto the surface of the eccentric.

The second arrangement is a connecting rod/crosshead piston arrangement. In this arrangement, one end of a connecting rod is mounted concentrically around an eccentric using a bearing (typically either a non-friction rolling element type, or a hydrodynamic oil bearing type) as an interface between the outer diameter of the eccentric and the inner diameter of the connecting rod end. The hydrodynamic bearing type has the advantage of being a "non-contacting" bearing, and therefore only wears during starts, stops, and certain upset conditions. Hydrodynamic bearings also have the advantage of being able to use the oil film that comprises them as a sort of cushion to absorb the impact loading that is often associated with cavitation upset conditions in reciprocating pumps. Lastly, hydrodynamic bearing designs are fairly compact, allowing the overall size of the power end to be significantly smaller than rolling element bearing designs, and much easier to manufacture and assemble. Rolling element bearings have the advantage of allowing for very low turndown ratios, as they do not rely on building a hydrodynamic oil film (and therefore on the tangential velocity of the bearing) to function. It is also possible to lubricate rolling element bearings with grease, negating the need for an oil system or cooling system.

There are several disadvantages that are shared by both cam/follower and connecting rod/crosshead piston arrangements, regardless of the specific bearing arrangement or other specific internal details. The first is the overall size and complexity of the drive, which contains all of the components necessary to create linear motion. Those components are typically quite expensive to manufacture, are relatively large in size and weight. Wearing components (primarily seals and bearings) must be replaced at regular intervals, are cumbersome to replace, and typically cause some level of collateral mess or damage when they do fail. The second disadvantage is that all pumps of this type create and induce pulsating flow, both upstream and downstream of the pump. This is inherent to traditional reciprocating pumps because they are translating rotary motion into linear motion, which means that the inlet and outlet flow in sinusoidal wave forms. These pulsations create an adverse effect on the inlet side of the pump that is often referred to as "acceleration head loss", or in other words, the losses incurred from having to constantly accelerate and decelerate the entire column of fluid upstream of the pump suction. The downstream pulsations typically cause harmonic vibration in the discharge piping that can cause the malfunction and/or failure of system components and/or the piping itself. To combat this, dampening devices must be added to the system, usually in the form of a high-pressure accumulator that is often referred to as a "surge chamber". These devices tend to be highly engineered, coded vessels, and are more often than not expensive and difficult to produce.

Fluid Ends:

A typical reciprocating fluid end will have a variety of different arrangements, but in general will always have an inlet port, outlet port, inlet check valve, outlet check valve, piston, and packing seals. Packing seals are often plastic materials, commonly blends of Polytetrafluoroethylene (PTFE) and structural modifiers such as fiberglass or carbon.

Fluid ends are typically fed by a series of manifolds that carry process fluid into and out of them for proper functionality. These manifolds range from simple runs of tube, to complex fabricated piping manifolds integrating valves and instrumentation, to high-pressure block-style manifolds for the collection of high-pressure discharge fluid. These manifolds tend to be somewhat complex, expensive, and are host to multiple tubing and piping connections, often resulting in leakage if these connections are not properly maintained, the effects of these leaks which are described in the next paragraph.

One mode of failure in the fluid end is usually that the packing wears, allowing the process fluid (often a hazardous substance) to leak into the intermediate space in between the "power end" and the "fluid end". In the case of cryogens, this is almost always considered hazardous, as large leaks of non-explosive substances pose an asphyxiate hazard. Explosive substances (such as hydrogen and light hydrocarbons) also pose this risk, but additionally introduce the risk of unwanted combustion. In either case, these risks are dealt with via the presence of an expensive and sometimes complex purge and leak detection system, used as both a containment and indication system for the failure of the packing. Under normal conditions, factors that induce wear in packing seals are pressure differential, piston speed, number of operating cycles, friction, piston to packing misalignment, and residual radial motion from the power end.

The typical secondary mode of failure is that of the piston rings. Under normal and healthy operating conditions, piston rings will live significantly longer than packing (although under adverse conditions, they will sometimes fail ahead of the packing). Failed piston rings pose no environmental threat; however, a failure of this type will result in a mild to severe loss in flow and discharge pressure performance depending on the degree of wear. Under normal conditions, factors that induce wear in piston rings are pressure differential, piston speed, number of operating cycles, friction, piston to piston ring angular misalignment, and residual radial motion from the power end.

The present application discloses pump systems that solve the aforementioned drawbacks in conventional reciprocating pumps. The present pump systems benefit from linear actuation which smooths out the power profile. As stated above, the term "linear actuation" refers to a system that avoids conversion of rotational motion to linear motion and its attendant vibratory energy. There are no dynamic seals which prevents failure from leakage. The primary benefit of a smooth, no pulse output and lack of dynamic seals translates to a longer life of the pump.

Figure 1:
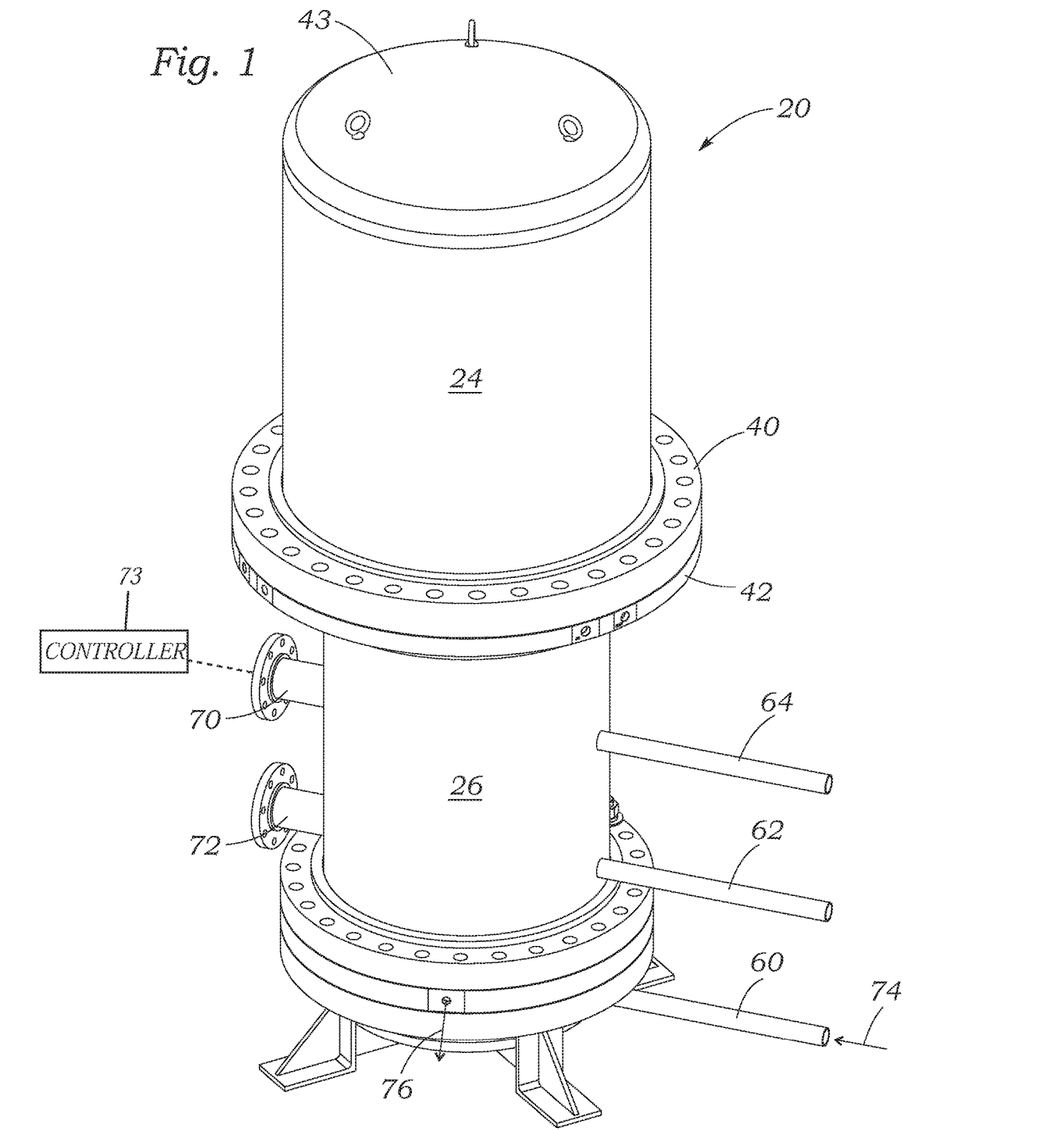
FIG. 1 is a perspective view of the exterior of an exemplary high-pressure LNG/LH2/LN2/LAR pump system of the present application.
Figure 2:
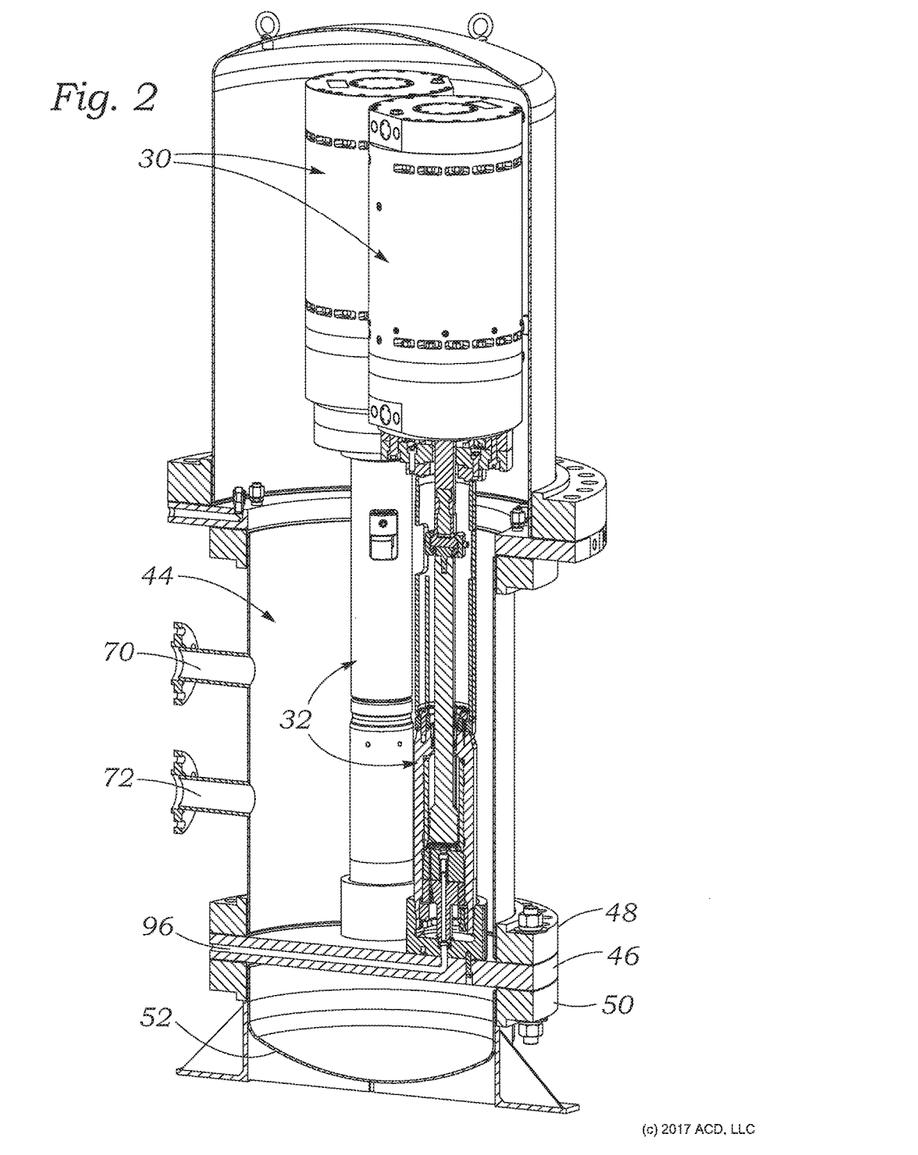
FIG. 2 is a sectional view of the pump system of FIG. 1 showing two of three internal linear pumps, one of which is partly sectioned.

FIG. 1 is a perspective view of the exterior of an exemplary high-pressure LNG/LH2/LN2/LAR pump system 20 of the present application, while FIG. 2 is a sectional view of the pump system showing two of three internal linear pumps 22, one of which is partly sectioned. It should be understood that the number of linear pumps 22 within each system can vary greatly based on modular design, though will typically be between 2-12. The system 20 features an outer sealed housing preferably segregated into an upper housing 24 bolted to a lower housing 26. Each of the internal linear pumps 22 includes an upper drive unit 30, in this case an electro-mechanical actuator, and a lower fluid distribution column 32 including inflow and outflow valves.

The upper housing 24 has an enlarged circumferential flange 40 bolted to an enlarged flange 42 at the top of the lower housing 26. The upper drive unit 30 is situated within the upper housing 24 without any conduits attached thereto so that the bell-shaped upper housing may be removed for servicing any of the drive components of the linear pumps. For example, an upper lid 43 of the upper housing 24 may be removed to access the drive unit 30 therein.

The lower fluid distribution column 32 of each of the electro-mechanical or hydraulic-driven pumps extends down in the internal cavity defined by the housing past the flanges 40, 42 into a lower chamber 44. A lower end of the lower housing 26 has an annular flange 48 that attaches with bolts to a lower manifold plate 46 which is sandwiched against a second annular flange 50. The first flange 48 is secured to an exterior of the lower housing 26, while the second flange 50 is secured to a lower fuel storage tank 52. Although the fuel storage tank 52 is shown immediately below the pump system 20, it may be located remotely above or below the system. Preferably, the fuel storage tank 52 shown is merely a holding tank that is supplied with pressurized fuel from a remote main tank (not shown). The enclosure of the upper drive units 30 and lower fluid distribution column 32 within the attached housings 24, 26 provides a sealed environment for the pump system. Any leakages from any of the linear pumps 22 in the system will thus be contained in the space within the common housings 24, 26. Moreover, pressure within the housings 24, 26 may be maintained at or very close to the pressure of the incoming fuel, which greatly reduces leakage from within the piston/cylinder assembly.

With reference back to FIG. 1, a number of conduits are shown extending from the pump system 20. A lower fluid conduit 60 comprises a fuel inlet that opens into the storage tank 52 below the pump system. An intermediate fluid conduit 62 opens to the lower chamber 44 within the lower housing 26 for liquid level control therein. Finally, an upper fluid conduit 64 also opens to the lower chamber 44 to allow for pressure control. A pair of larger instrument conduits 70, 72 open to the lower chamber 44 and provide feedthroughs for a number of power and electrical instrument cables (not shown) that connect external electronics such as a controller 73 to the drive units 30 of the linear pumps 22. Because the conduits 70, 72 connect to the lower housing 26, the upper housing 24 can easily be removed for servicing the drive units 30.

Figures 3A, 3B, 3C:
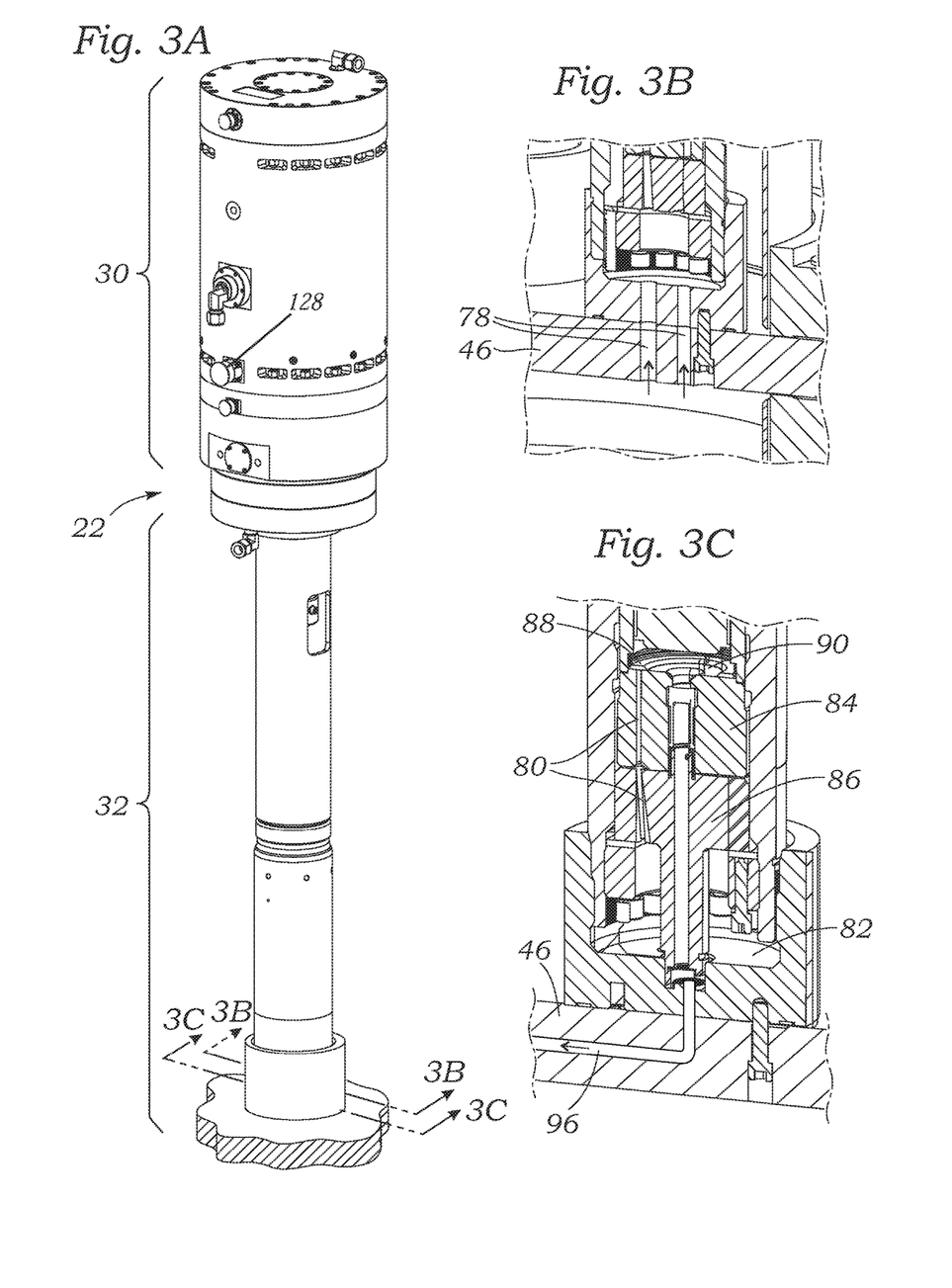
Figure 4:
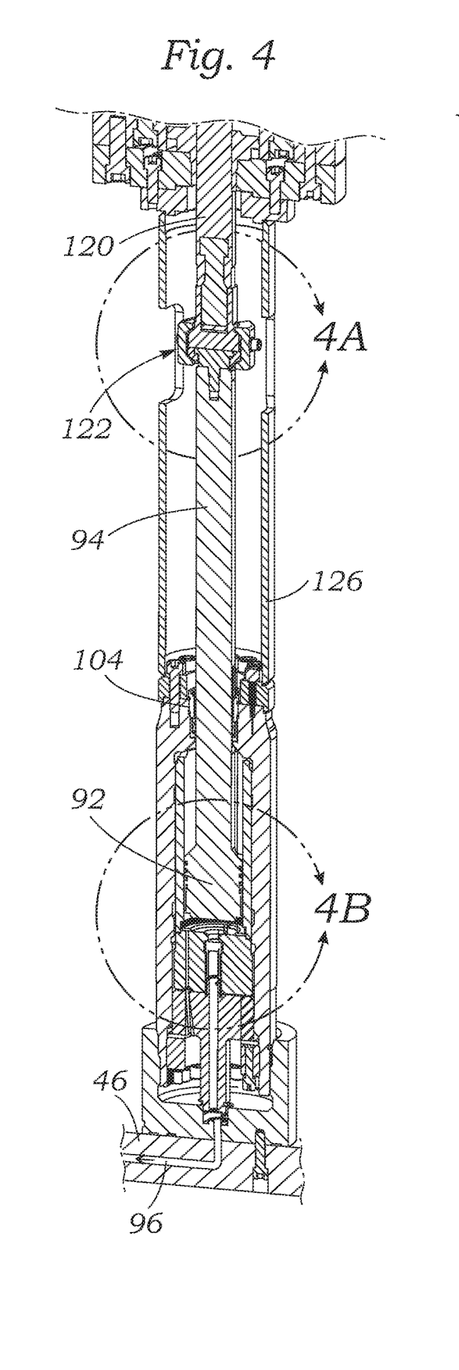
Figure 4A:
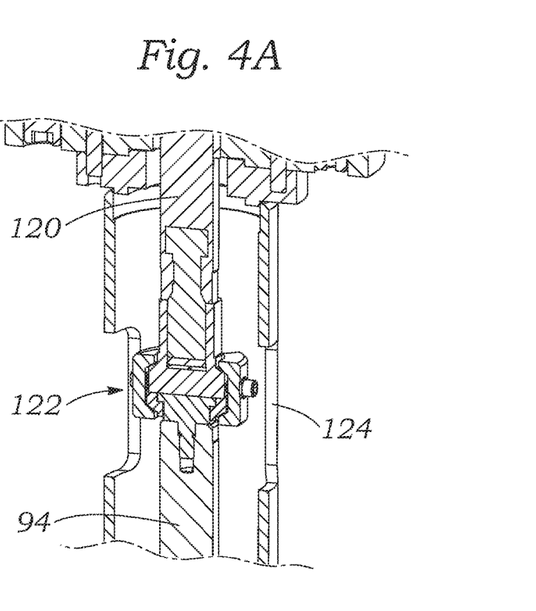
FIGS. 4A and 4B are exploded views of portions thereof.
Figure 4B:
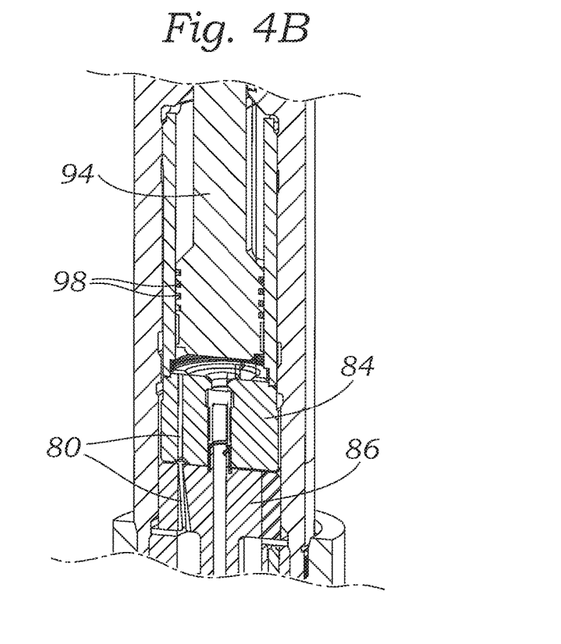
Figure 5:
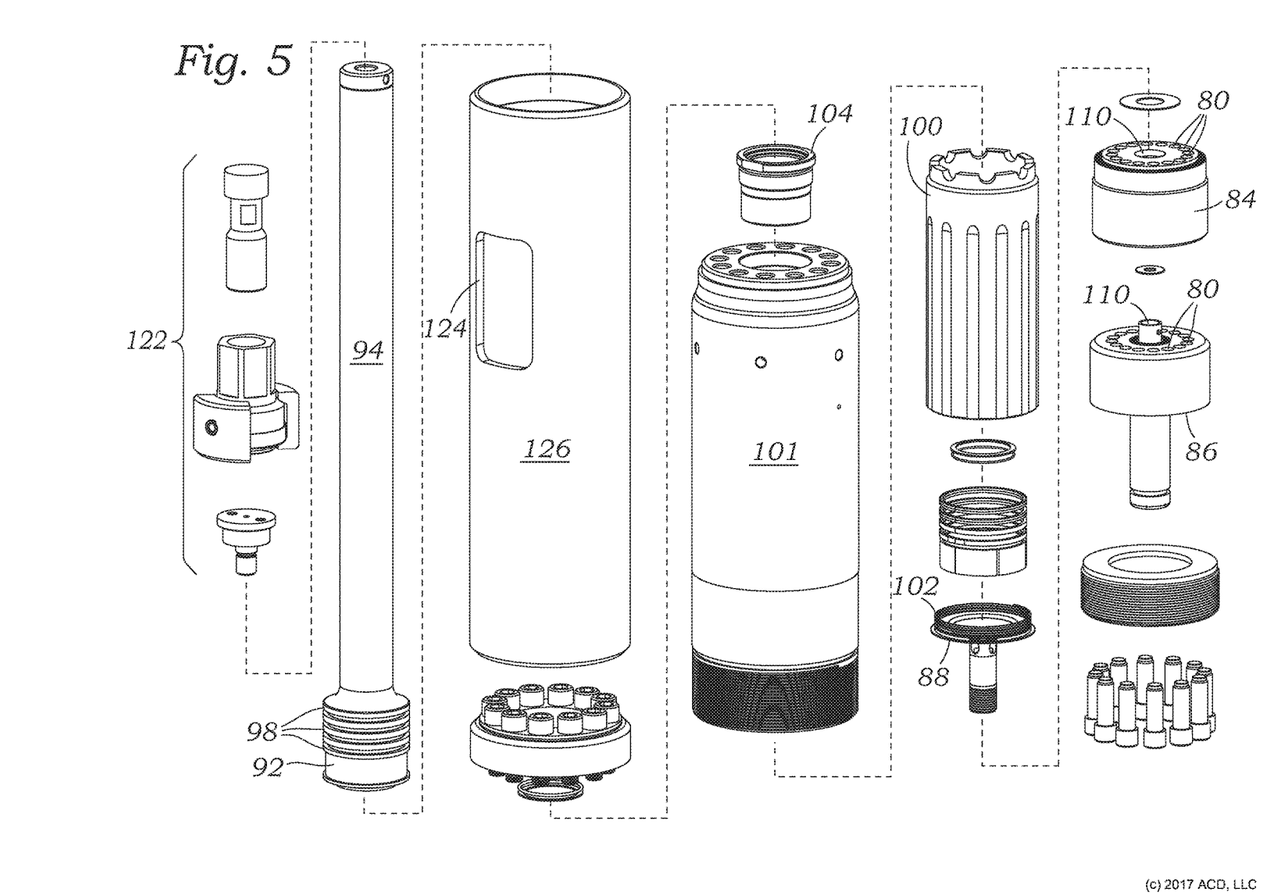
FIG. 5 is a perspective exploded view of the lower end of the internal pump shown in FIG. 4.

FIG. 1 also shows a fluid inlet arrow 74 and a fluid outlet arrow 76. As mentioned, fluid in from a remote tank passes through the lower fluid conduit 60 and into the internal chamber defined by the storage tank 52. FIG. 3A is a perspective view while FIGS. 3B and 3C are partial sectional views of one of the linear pumps 22. FIG. 4 is an enlarged view of a lower end of one of the linear pumps, while FIGS. 4A and 4B are exploded views of portions thereof. Finally, FIG. 5 is a perspective exploded view of the lower end of the internal pump, and references should be made to the components shown in this view in conjunction with the assembled views.

FIG. 3B illustrates a pair of flow passages 78 extending vertically through the manifold plate 46 that connects the storage tank 52 to a lower interior chamber of the fluid distribution column 32 of each of the linear pumps 22. Both FIGS. 3C and 4B show one of a plurality of vertical channels 80 leading upward from a lower sump chamber 82 through a pair of valve members 84, 86 stacked on top of one another. The channels 80 are preferably evenly spaced around the common axis of the valve members 84, 86 and there may be anywhere from 2-16 channels (see FIG. 5). The vertical channels 80 open at their upper ends at the top of the upper valve member 84 below an annular lifter valve 88. Above the lifter valve 88 is a head space 90 just below a head 92 of a piston 94.

As mentioned, the upper drive unit 30 (electro-mechanical or hydraulic actuator) acts to drive the piston 94 linearly in a periodic fashion. Up and down movement of the piston 94 sliding within the column 32 withdraws fluid from the storage tank 52 and ultimately expels it through a second flow passage 96 (see FIGS. 2 and 3C) in the manifold plate 46 that leads to the outlet port indicated by the fluid outlet arrow 76 in FIG. 1. It will be understood that a plurality of the lower flow passages 96 lead to a single outlet port 76 which is common to the plurality of linear pumps 22. Coordinated actuation of the linear pumps 22 enables a smooth, constant output pressure profile through the common outlet port.

The head 92 of the piston 94 has a series of vertically-spaced piston rings 98 (see FIGS. 4B and 5) that provide sealed sliding contact with an inner lumen of a sleeve member 100. The sleeve member closely fits within an inner cylindrical cavity of a lower housing section 101 of the fluid distribution column 32. Upward motion of the piston 94 creates a negative pressure gradient within the head space 90 which in turn pulls fluid from the sump chamber 82 through the vertical channels 80. The lifter valve 88 maintains the upper ends of the channels 80 closed by virtue of a coil spring 102 between the lifter valve and the lower valve member 86 until such time as the suction within the head space 90 exceeds a predetermined amount. At an upper end of the lower housing section 101 a tubular seal 104 prevents escape of any fluid or gas from within the sleeve member 100 past the piston 94.

Once the piston 94 reaches the top of its travel, the lifter valve 88 closes over the vertical channels 80. Downward movement of the piston 94 forces the fluid drawn in to the head space 90 through a central flow port 110 aligned in the upper and lower valve members 84, 86. As seen in FIG. 3C, the fluid is then expelled through the second flow passage 96 in the manifold plate 46 such as through a one-way valve.

The aforementioned assembly of the lower fluid distribution column 32 features integrated suction, discharge, and hydraulic (where applicable) manifolds to reduce the number of seals required and thus reduce leakage. More specifically, inlet (i.e., manifold plate 46 and flow passages 78, 80), discharge (manifold plate 46, central flow port 110 and flow passage 96), and vent manifolds are integrated directly into the pump, eliminating the need to fabricate and install them in the pumping system, which drastically reduces the number of required fittings. The "vent manifold" comprises the interior of the sealed housing which, as stated, is preferably maintained at the same pressure as the inlet fuel.

With reference back to FIGS. 4 and 4A, it should be noted that the piston 94 is driven by an output shaft 120 depending downward from the upper drive unit 30. The output shaft 120 connects to the piston 94 via a coupling assembly 122, shown exploded in FIG. 5. FIG. 3 illustrates one of a pair of diametrically opposed windows 124 in an upper housing section 126 of the fluid distribution column 32. The window 124 provides access to install/remove the coupling assembly 122 if it is necessary to repair/replace either the upper drive unit 30 or the components of the fluid distribution column 32. That is, the coupling assembly 122 enables easy separation of these two main units.

Figure 6:
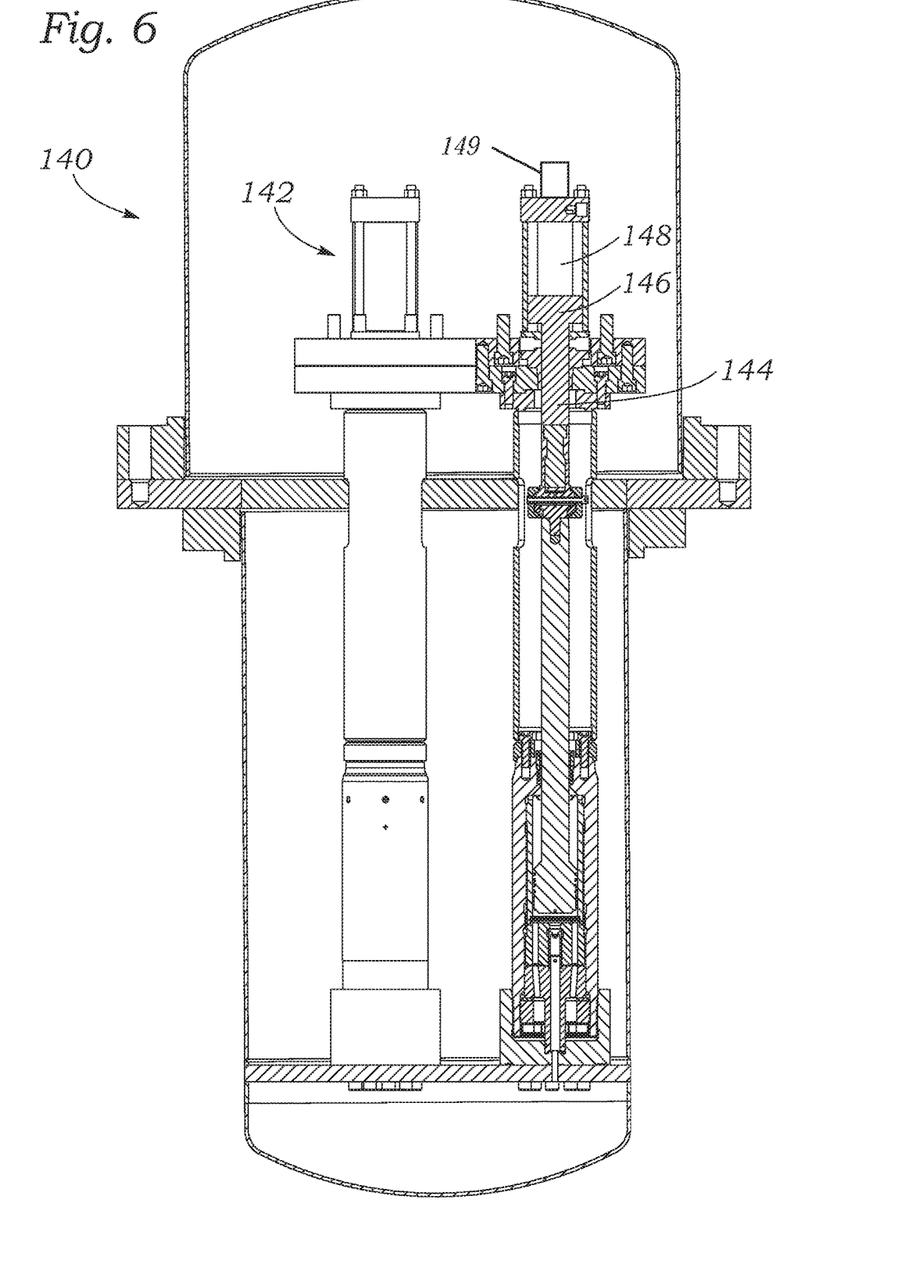
FIG. 6 is a vertical sectional view through an alternative pump system of the present application utilizing a hydraulic actuation system.

FIG. 6 is a vertical sectional view through an alternative pump system 140 of the present application utilizing hydraulics. More particularly, elements of the alternative pump system 140 are the same as described above for a motorized system, but the upper drive unit 30 comprises a hydraulic piston/cylinder assembly 142. That is, an output shaft 144 that joins to the coupling assembly 122 has an upper head 146 that forms the piston of the piston/cylinder assembly 142. Cyclic introduction and withdrawal of a pressurized fluid, preferably hydraulic oil, into an upper cylinder chamber 148 drives the output shaft 144, which in turn drives the main piston 94. A sensor such as a linear variable differential transducer (LVDT) 149 is desirably mounted along the hydraulic cylinder and functions to constantly and directly monitor the position of the hydraulic piston within the cylinder. In conjunction with feedback and control software, the LVDT enables very accurate control of the position, velocity, and acceleration of the hydraulic piston.

Figure 7:
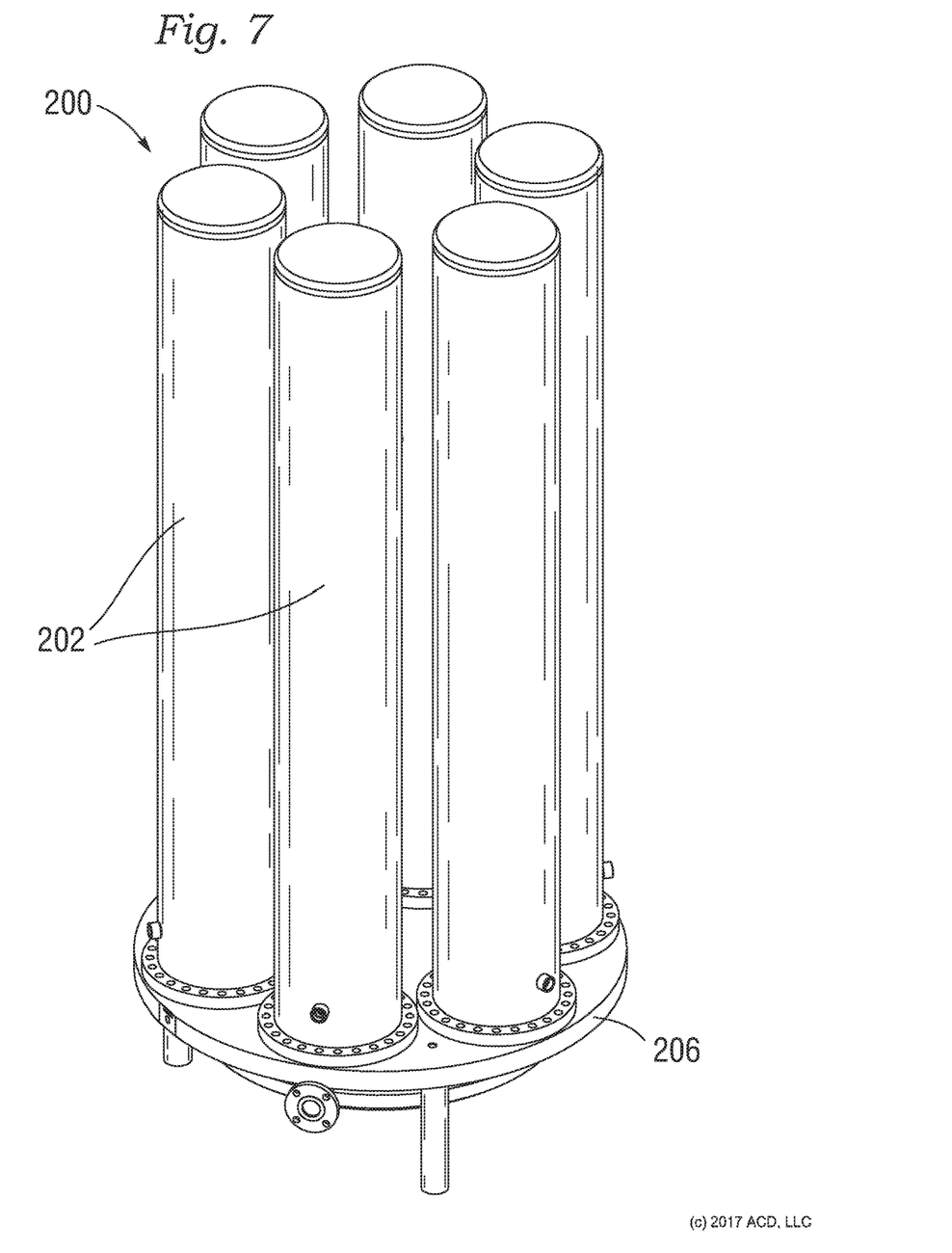
FIG. 7 is a perspective view of an alternative high-pressure LNG/LH2/LN2/LAR pump system of the present application having individually sealed linear pumps.

FIG. 7 is a perspective view of an alternative high-pressure LNG/LH2/LN2/LAR pump system 200 of the present application having individually sealed linear pumps. The system 200 includes a series of internal linear pumps (not shown) each having an upper drive unit and a lower fluid distribution column including inflow and outflow valves, as shown above. However, rather than the outer housings 24, 26 encompassing all of the single pump units, each unit is sealed within its own generally tubular outer housing 202. Any leakages in any one of the pumps will thus be contained within its own sealed housing 202. A lower circular manifold plate 206 includes the necessary manifolds, ports and flow connections to facilitate the needed fluid transfers. Some of the connections are not shown, and it should be understood that each of the individual pumps within the housings 202 function in a similar manner to those described above housed within a common outer casing.

The presently disclosed pump is a clear departure from traditional reciprocating pump technology in a number of ways. There is still a "power end" and a "fluid end," however the architecture of those components, and the way that they interact with each other, has changed. All of the components of this pumping system are incorporated into a sealed casing 24, 26, completely eliminating the aforementioned issues that revolve around hazardous fluids leaking to atmosphere, and eliminating the infrastructure required to monitor and prevent that leakage. Inlet, discharge, and vent manifolds are integrated directly into the pump, eliminating the need to fabricate and install them in the pumping system, and additionally eliminating the risks of leakage by drastically reducing the number of required fittings.

The exemplary pump demonstrates its maximum functionality and efficiency when configured as a multiple cylinder unit (e.g., three units 30 as shown), available with either single or dual acting fluid ends. Cylinders are arranged in a vertical arrangement. Unlike traditional reciprocating pumps, each cylinder of the present pump is independently controllable, allowing for unprecedented flow control, pressure control, and turndown ratio. The present pump does not solely replace a traditional reciprocating pump; it eliminates the requirement for a significant amount of the support infrastructure required to operate traditional reciprocating pumps, making it not a new pumping machine solution, but instead a new pumping system solution.

Power Ends:

The power end of the present pump is available as either a hydraulically or electrically actuated unit. The electric and hydraulic drive units, while mechanically dissimilar, provide the same benefits when compared to a traditional reciprocating pump power end.

Unlike traditional power ends, the present pump power ends provide pure linear motion (rather than rotary motion that is being translated to reciprocating motion). In addition, the drive unit on each cylinder is independently controllable, as they are not mechanically linked via a crankshaft as traditional designs are. Each drive is electronically controlled, and can have parameters such as position, speed, and acceleration specifically tailored for various applications, and for specific operations within a given application.

The first drive method is to use a hydraulic cylinder to drive the fluid end. The linear rate of travel of the piston is determined by the flow rate into the hydraulic cylinder and by the diameter of the piston within the hydraulic cylinder. The maximum "rod load" of the hydraulic cylinder is a function of the area of the piston within that cylinder and the hydraulic pressure that's acting upon it. The benefit of this arrangement is that rod load capability can be increased by either increasing hydraulic pressure or by increasing the diameter of the hydraulic piston. The flow rate into the hydraulic cylinder is controlled via an electronic servo valve. This servo valve is controlled via software contained within a multi-axis electronic controller (such as controller 73 seen schematically in FIG. 1). Input to this controller is preferably provided via the linear variable differential transducer (LVDT) 149 that is mounted to the hydraulic cylinder. This transducer constantly and directly monitors the position of the hydraulic piston within the cylinder. Together, these components form a closed loop control system that is capable of very accurately maintaining position, velocity, and acceleration components of the hydraulic cylinder's movement.

The second drive method is to use an electro-mechanical actuator to drive the fluid end. In essence, this actuator is a ball screw being driven by an integrated electric motor. The linear rate of travel of the actuator is directly proportional to the speed of the electric motor. The maximum rod load of the actuator is, basically, a function of the available motor torque. This rod load can generally be increased by increasing either the size or the amp capacity of the electric motor. The torque and speed of the motor are controlled by a specialized motor drive controller (similar to a variable frequency drive). The position of the actuator is controlled via the rotational position and number of rotations that the motor performs. These parameters are monitored via a sensor such as an electronic rotational commutator 128 (FIG. 3A). The controller uses the output from the commutator to count the number of motor rotations, then utilizes the pitch of the ball screw to calculate the axial position of the actuator. Together, these components form a closed loop control system that is capable of very accurately maintaining position, velocity, and acceleration components of the electro-mechanical actuator's movement.

In each of these cases, the drive systems are significantly simpler than traditional reciprocating pump power ends. This inherently adds to the overall reliability of the drive system. Drive components are relatively easy to access when maintenance is required. Failures are detectable via onboard instrumentation. These failures typically would not be catastrophic, as the drives on each of the cylinders are not mechanically linked to each other. In the event of a failure, cylinders may be independently shut down, and operation of the pumping system continued at either a reduced output or an increased duty cycle. This is especially easy if the pumps are individually sealed, as in the embodiment shown in FIG. 7.

The motion of each cylinder can be tailored to whatever profile is desired. This is advantageous because it allows for the elimination of the sinusoidal discharge profile that would be experienced with traditional reciprocating power ends. Instead, the discharge profile can be tailored to provide a constant, pulsation free output flow and pressure. This effectively eliminates acceleration head losses, significant amounts of system vibration, and the requirement for the complex and expensive infrastructure (e.g., a "surge chamber") that is traditionally used to compensate for pressure pulsation and vibration.

The design of these drive systems is such that they are not dependent on the speed of the drive to maintain appropriate lubrication (as traditional power ends do). This means that the present pump can be "turned down" to incredibly low flow rates, providing a near infinite turndown ratio, something that is unattainable with traditional technology. For instance, the maximum operating speed of the present pumping system is preferably about 120 cycles per minute, though the system may be operated at as low a rate as 1 cycle per minute.

Fluid Ends:

Like a typical reciprocating fluid end, the present pump fluid end has an inlet port, outlet port, inlet check valve, outlet check valve, and piston, however unlike previous designs, this fluid end has no packing.

Instead of being fed by a series of complex manifolds, the present pump fluid ends are fed by a combination inlet and discharge manifold that is integrated directly into the body of the present pump. There are no tubes, pipes, or fittings in this design. The cold ends are mounted directly into the pump structure via the aforementioned manifold. Vent gas is flowed harmlessly into the annular space of the present pump sealed structure. Process connections on the present pump are reduced significantly when compared to traditional technology, from dozens, to preferably less than ten, and more preferably to just three or four.

The primary mode of failure in traditional technology is usually that the packing wears, allowing the process fluid to leak to atmosphere. The packing has been eliminated in the present pump design. The fluid ends are housed in the sealed pump casing. This pump casing is kept at the same pressure as the fluid that is feeding the pump. As such, there is no differential pressure from the internal to the external of the cold end to promote leakage flow, so no packing is required. With the packing removed, the new primary mode of failure is that of the piston rings, items that typically have significantly longer life than the packing. To further increase the life of the fluid ends, the maximum operating speed of the present pumping system is approximately 120 cycles per minute.

To summarize, this overall architecture provides several benefits, including but not limited to the following:
Sealed design
Packing free cold ends eliminate primary wear parts
Maximum 120 cycles per minute for maximum life (20,000+ hours mean time between overhaul)
Near infinite turndown ratio
Hydraulically or electrically powered
Integrated suction, discharge, and hydraulic (where applicable) manifolds
Built in redundancy
Pulsation free operation (no surge chamber required)
Integrated water-glycol vaporizer available The present disclosure provides a high-pressure pump typically for applications with high-pressure fuel systems such as marine, industrial gas and alternative energy fuel systems. The exemplary pump will be designed with the intent of simplifying and reducing size over current designs, as well as focus on having a life span increase of 200-500%, significantly reduced operating costs, and greater ease of maintainability. Features of this design will include flow rates to 130 GPM, discharge pressures of up to 900-1000 bar, a fully contained & sealed package, and drive/control using linear electro-mechanical or hydraulic actuation. These will typically be sold in a set of two (2) units for 100% redundancy, however the design is such that it allows continued operation of a single unit at reduced capacity in the event of a cylinder failure.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

It is claimed:

1. A system for pumping of cryogenic fuel from a fuel source to provide a smooth, pulse-free output, comprising:
   software contained within a multi-axis electronic controller;
   a plurality of linear pumps each including:
   i. an upper power end and a lower fluid end, the power end having a linear-actuated drive system terminating in a drive shaft that linearly reciprocates along an axis;
   ii. the power end drive system of each pump being independently controllable via the software contained within the multi-axis electronic controller;
   iii. the fluid end having a piston coupled to the drive shaft of the power end so as to linearly reciprocate within a fluid cylinder, the piston having a head with a plurality of piston rings distributed thereon that provide sealed sliding contact with an inner lumen of the fluid cylinder;

iv. an absence of packing seals between the piston and the fluid cylinder;
v. an inlet passageway in fluid communication with a cryogenic fluid source and leading to a lower end of each fluid cylinder and into valved communication with a head space open to and below the head of the piston therein, wherein upward motion of the piston creates a negative pressure gradient in the head space sufficient to allow cryogenic fuel into the head space, and downward motion of the piston expels cryogenic fuel through a lower flow passage and into an outlet port common to all of the fluid cylinders;

a sealed housing disposed around and completely enclosing one or more of the linear pumps including the upper power end and lower fluid end of each pump, the housing being sealed to contain any of the cryogenic fuel that escapes from within the fluid cylinder; and wherein operation of the system includes coordinated actuation of the separate pumps to result in a pulse-free output pressure profile.

2. The system of claim 1, wherein each power end drive system comprises an electro-mechanical actuator having an actuator in the form of a rotating ball screw aligned along the axis, and the system for pumping includes a sensor to monitor rotational movement of the actuator and a closed loop control system configured to maintain position, velocity, and acceleration components of the drive shaft and piston therefore.

3. The system of claim 1, wherein each power end drive system comprises a hydraulic cylinder above the drive shaft whose up and down movement is controlled via an electronic servo valve.

4. The system of claim 3, further including a linear variable differential transducer (LVDT) mounted to the hydraulic cylinder that monitors the position of the piston within the fluid cylinder and a closed loop control system configured to maintain position, velocity, and acceleration components of the drive shaft and piston therefore.

5. The system of claim 1, wherein the sealed housing is sealed around a plurality of the linear pumps.

6. The system of claim 5, further including a common lower manifold to which the lower flow passage of each linear pump connects.

7. The system of claim 5, wherein the sealed housing comprises an upper housing generally surrounding the upper power end and secured to a lower housing generally surrounding the lower fluid end, and wherein there are no conduits attached to the upper housing so that the upper housing may be easily removed for servicing the power end drive system.

8. The system of claim 1, wherein there is a separate sealed housing sealed around each one of the plurality of the linear pumps, and further including a common lower manifold to which the lower flow passage of each linear pump connects.

9. The system of claim 1, wherein an inlet tank for receiving and storing cryogenic fuel is located below the plurality of linear pumps, and the system includes a manifold disposed above the inlet tank to which the inlet passageway of each linear pump connects.

10. The system of claim 1, wherein a valving subsystem between the inlet passageway of each fluid cylinder opens at a sump chamber at a lower end of the fluid cylinder, the sump chamber being located between the fluid cylinder and a lower end of two passage-defining members stacked on top of each other, an upper passage-defining member and a lower passage-defining member, wherein the passage-defining members have axially aligned channels therein leading from the sump chamber to the head space open to and below the head of the piston, and wherein a lifter valve is biased into contact with the upper passage-defining member to close upper ends of the channels in the absence of a negative pressure gradient in the head space, the passage-defining members further defining a flow port therethrough from the head space to the lower flow passage outside of the fluid cylinder that leads to the common outlet port, wherein upward motion of the piston creates a negative pressure gradient in the head space sufficient to raise the lifter valve and allow cryogenic fuel into the head space, and downward motion of the piston closes the lifter valve and expels cryogenic fuel at an elevated pressure through the flow port, lower flow passage and into the common outlet port.

11. The system of claim 1, wherein each linear-actuated drive system is operable at a maximum operating speed of about 120 cycles per minute, and may be operated down to about 1 cycle per minute.

12. The system of claim 1, wherein the power end drive system of each pump is independently controllable using an electro-mechanical actuator driven by an integrated electric motor, wherein the torque and speed of the motor are controlled by a motor drive controller and the position of the actuator is controlled via the rotational position and number of rotations of the motor monitored via an electronic rotational commutator, and wherein the controller uses the output from the commutator to count the number of motor rotations, then calculates the axial position of the actuator to form a closed loop control system that is capable of maintaining position, velocity, and acceleration components of the electro-mechanical actuator's movement, such that coordinated actuation of the separate pumps results in a pulse-free output pressure profile.

13. A method for pumping of cryogenic fuel from a fuel source to provide a smooth, pulse-free output, comprising:
providing a pumping system having a plurality of linear pumps each including in series an upper power end and a lower fluid end, the power end having a linear-actuated drive system terminating in a drive shaft that linearly reciprocates along an axis, the system having software contained within a multi-axis electronic controller, and the power end drive system of each pump being independently controllable via the software contained within the multi-axis electronic controller;
wherein the fluid end of each linear pump has a piston coupled to the drive shaft of the power end so as to linearly reciprocate within a fluid cylinder, each linear pump having no packing seals between the piston and the fluid cylinder so as to reduce wear and extend operating life, and the fluid cylinders of the plurality of linear pumps have outlet flow passages leading to a common outlet port;
supplying cryogenic fuel from a fuel source to an inlet passageway of the fluid cylinder of each of the plurality of linear pumps;
actuating the drive system to displace the drive shaft and coupled piston of each of the plurality of linear pumps so as to pull cryogenic fuel into the respective fluid cylinders and expel the cryogenic fuel through the outlet flow passages to the common outlet port, and coordinating actuation of the separate linear pumps to result in a pulse-free output pressure profile; and
providing a sealed housing around and completely enclosing one or more of the linear pumps including the upper power end and lower fluid end of each pump, the housing being sealed to contain any of the cryogenic fuel that escapes from within the fluid cylinder.

14. The method of claim 13, wherein each power end drive system comprises an electro-mechanical actuator having an actuator in the form of a rotating ball screw aligned along the axis, and the system for pumping includes a sensor to monitor rotational movement of the actuator and a closed loop control system configured to maintain position, velocity, and acceleration components of the drive shaft and piston therefore, and including the step of coordinating actuation of the plurality of linear pumps to result in a smooth, pulse-free output.

15. The method of claim 13, wherein each power end drive system comprises a hydraulic cylinder above the drive shaft whose up and down movement is controlled via an electronic servo valve.

16. The method of claim 15, further including a linear variable differential transducer (LVDT) mounted to the hydraulic cylinder that monitors the position of the piston within the fluid cylinder and a closed loop control system configured to maintain position, velocity, and acceleration components of the drive shaft and piston therefore, and including the step of coordinating actuation of the plurality of linear pumps to result in a smooth, pulse-free output.

17. The method of claim 13, wherein the step of providing a sealed housing includes enclosing the plurality of the linear pumps with a single housing.

18. The method of claim 17, wherein the sealed housing comprises an upper housing generally surrounding the upper power end and secured to a lower housing generally surrounding the lower fluid end, and wherein there are no conduits attached to the upper housing so that the upper housing may be easily removed for servicing the power end drive system.

19. The method of claim 13, wherein the step of providing a sealed housing includes enclosing each one of the plurality of the linear pumps with a separate housing, and further including a common lower manifold to which the lower flow passage of each linear pump connects.

20. The method of claim 13, wherein an inlet tank is located below the plurality of linear pumps, and the system includes a manifold disposed above the inlet tank to which the inlet passageway of each linear pump connects.

21. The method of claim 13, wherein the cryogenic fuel is liquid natural gas stored at temperatures of below −150° C., and the sealed housing maintains an inner pressure which is the same as the stored liquid natural gas.

22. The method of claim 13, wherein each linear-actuated drive system is operable at a maximum operating speed of about 120 cycles per minute, and may be operated down to about 1 cycle per minute.

23. The method of claim 13, wherein the power end drive system of each linear pump is independently controllable using an electro-mechanical actuator driven by an integrated electric motor, wherein the torque and speed of the motor are controlled by a motor drive controller and the position of the actuator is controlled via the rotational position and number of rotations of the motor monitored via an electronic rotational commutator, and wherein the controller uses the output from the commutator to count the number of motor rotations, then calculates the axial position of the actuator to form a closed loop control system that is capable of maintaining position, velocity, and acceleration components of the electro-mechanical actuator's movement, such that coordinated actuation of the separate pumps results in a pulse-free output pressure profile.

24. The method of claim 13, wherein the power end drive system of each linear pump is independently controllable using an integrated electric motor, wherein each of the linear pumps are independently started and stopped so as to have integrated redundancy and provide an uninterrupted and pulse-free output pressure profile.

* * * * *